(12) United States Patent
Farnell

(10) Patent No.: US 9,409,774 B2
(45) Date of Patent: Aug. 9, 2016

(54) PROCESS FOR THE CONVERSION OF A HYDROCARBON FEEDSTOCK INTO A SYNTHESIS GAS

(71) Applicant: JOHNSON MATTHEY PUBLIC LIMITED COMPANY, London (GB)

(72) Inventor: Peter William Farnell, North Yorkshire (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/440,755

(22) PCT Filed: Oct. 11, 2013

(86) PCT No.: PCT/GB2013/052663
§ 371 (c)(1),
(2) Date: May 5, 2015

(87) PCT Pub. No.: WO2014/072679
PCT Pub. Date: May 15, 2014

(65) Prior Publication Data
US 2015/0284248 A1    Oct. 8, 2015

(30) Foreign Application Priority Data
Nov. 6, 2012    (GB) .................................... 1219960.0

(51) Int. Cl.
*C01B 3/38*    (2006.01)

(52) U.S. Cl.
CPC ......... *C01B 3/382* (2013.01); *C01B 2203/0233* (2013.01); *C01B 2203/0244* (2013.01);
(Continued)

(58) Field of Classification Search
CPC ............... C01B 2203/0244; C01B 2203/0495; C01B 2203/1241; C01B 2203/062; C01B 3/382; C01B 2203/061; C01B 2203/0883; C01B 2203/1623; C01B 2203/0233; C01B 2203/141; C01B 2203/142; C01B 2203/068; C01B 2203/04; C01B 2203/0844
See application file for complete search history.

(56) References Cited

U.S. PATENT DOCUMENTS

| 5,122,299 A | 6/1992 | LeBlanc |
| 2004/0182002 A1* | 9/2004 | Malhotra ............... B01J 8/0488 48/198.7 |

FOREIGN PATENT DOCUMENTS

| EP | 0 504 471 A1 | 9/1992 |
| EP | 0 983 963 A2 | 3/2000 |
| EP | 1 403 216 A1 | 3/2004 |

(Continued)

OTHER PUBLICATIONS

International Search Report, dated Jan. 23, 2014, from corresponding PCT application.
GB Search Report, dated Apr. 8, 2014, from corresponding GB application.

*Primary Examiner* — Stanley Silverman
*Assistant Examiner* — Syed Iqbal
(74) *Attorney, Agent, or Firm* — Young & Thompson

(57) ABSTRACT

A process for converting a hydrocarbon feedstock into a synthesis gas includes: (i) passing a first stream including a hydrocarbon and steam to externally-heated catalyst-filled tubes in a heat exchange reformer where steam reforming reactions take place to generate a first reformed gas mixture, (ii) passing a second stream including a hydrocarbon and steam, after a heating step, to an autothermal reformer, where it is combined with an oxidant gas containing free oxygen and autothermally reformed to generate a second reformed gas mixture, (iii) mixing the second reformed gas mixture and the first reformed gas mixture to form a combined reformed gas mixture, and (iv) using the combined reformed gas mixture to heat the catalyst filled tubes in the heat exchange reformer to form a partially-cooled combined reformed gas mixture, wherein the partially-cooled combined reformed gas mixture is used to pre-heat the second stream fed to the autothermal reformer.

14 Claims, 2 Drawing Sheets

Figure 1:
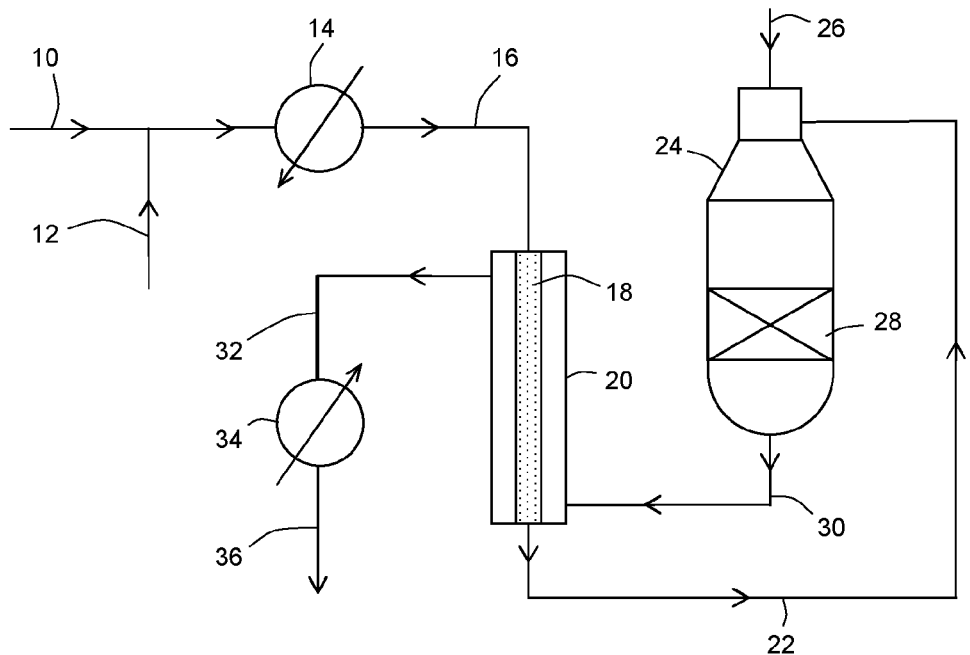

(52) U.S. Cl.
CPC ..... *C01B2203/04* (2013.01); *C01B 2203/0495* (2013.01); *C01B 2203/061* (2013.01); *C01B 2203/062* (2013.01); *C01B 2203/068* (2013.01); *C01B 2203/0844* (2013.01); *C01B 2203/0883* (2013.01); *C01B 2203/1241* (2013.01); *C01B 2203/141* (2013.01); *C01B 2203/142* (2013.01); *C01B 2203/148* (2013.01); *C01B 2203/1623* (2013.01)

(56) References Cited

FOREIGN PATENT DOCUMENTS

| EP | 1 650 160 A1 | 4/2006 |
| WO | 2009/155554 A2 | 12/2009 |
| WO | 2010/122031 A1 | 10/2010 |
| WO | 2011/150090 A1 | 12/2011 |

\* cited by examiner

PROCESS FOR THE CONVERSION OF A HYDROCARBON FEEDSTOCK INTO A SYNTHESIS GAS

BACKGROUND OF THE INVENTION

1. Field of the Invention

This invention relates to a process for the production of synthesis gas by the parallel use of a heat exchange reformer and an autothermal reformer.

2. Description of the Related Art

Parallel reforming may be used to produce hydrogen streams and synthesis gas for a number of processes such as ammonia synthesis, methanol synthesis as well as the Fischer-Tropsch process. In a parallel reforming process, a desulphurised hydrocarbon feedstock, e.g. natural gas, is mixed with steam and the mixture divided into two parts that are reformed in parallel. One part is fed to a heat exchange reformer (HER) where it is steam reformed, usually in externally-heated catalyst-filled tubes, and the other part is fed to an autothermal reformer (ATR) where it is usually combined with an oxygen-containing gas and autothermally reformed. The two reformed gas mixtures are combined and used to heat the catalyst filled tubes in the HER. The combined gas is then often subjected to one or more cooling stages, which may include stages of steam generation and may include pre-heating the mixed feed to the HER and ATR. Such a processes is described for example in U.S. Pat. No. 5,011,625.

One of the necessary features of the parallel reforming scheme is that the gas exit the HER tubeside is at a lower temperature than the gas exit the ATR. This is because to reach the same tubeside exit temperature as the ATR, the HER would require an infinite surface area. Therefore, to remain a practical size and cost, the HER must have a lower tubeside exit temperature to provide a realistic heat transfer rate through the tubes. The lower temperature of the tubeside gas means that it will have a higher methane slip, which is undesirable; therefore to avoid this, additional steam is typically fed to the feed gas flowing into the tubeside of the HER. In addition, the temperature difference between the reformed gas exiting the shellside of the HER and the temperature of the mixed feed to the tubeside is a measure of the efficiency of the reforming scheme. The higher the difference, the less efficient the scheme and the larger the flow of oxidant required to be fed to the ATR to make up for the higher amount of heat being lost from the reforming system. This may not only be a penalty in terms of oxidant flow, but too high an oxidant flow may be undesirable for the downstream processes by making the stoichiometry of the gas less than ideal. Furthermore, to ensure that the HER tubeside gas can be heated hot enough to have a low methane slip; the flow through the tubeside must be much smaller than the flow through the heating side. The need to feed a much higher flow through the shellside of the parallel HER to create a high tubeside exit temperature also lowers the efficiency of the parallel scheme.

SUMMARY OF THE INVENTION

We have developed a process that overcomes the problems with the prior art schemes.

Accordingly the present invention provides a process for the conversion of a hydrocarbon feedstock into a synthesis gas comprising:

(i) passing a first stream comprising a hydrocarbon and steam to externally-heated catalyst-filled tubes in a heat exchange reformer where steam reforming reactions take place to generate a first reformed gas mixture, (ii) passing a second stream comprising a hydrocarbon and steam, after a heating step, to an autothermal reformer, where it is combined with an oxidant gas containing free oxygen and autothermally reformed to generate a second reformed gas mixture, (iii) mixing the second reformed gas mixture and the first reformed gas mixture to form a combined reformed gas mixture, and (iv) using the combined reformed gas mixture to heat the catalyst filled tubes in the heat exchange reformer to form a partially-cooled combined reformed gas mixture, wherein the partially-cooled combined reformed gas mixture is used to pre-heat the second stream fed to the autothermal reformer.

The first and second streams may be formed individually from the same or different hydrocarbon sources and pre-heated individually, or preferably, one hydrocarbon source is used and the process comprises (i) forming a mixed feed stream comprising a hydrocarbon feedstock and steam, (ii) preheating the mixed stream to form a pre-heated mixed stream and (iii) dividing the preheated mixed stream into a first stream and a second stream. The preheating step may be performed using a fired heater but may also be performed by utilising heat from the synthesis gas. Thus in a preferred embodiment, the partially-cooled combined reformed gas mixture is used to pre-heat the second stream fed to the autothermal reformer and preheat the mixed stream. Preferably the partially-cooled combined reformed gas mixture is used to pre-heat the second stream fed to the autothermal reformer and then preheat the mixed stream in series.

The hydrocarbon feedstock may be any gaseous or low boiling hydrocarbon feedstock such as natural gas or naphtha. It is preferably methane or natural gas containing a substantial proportion, e.g. over 90% v/v methane. If the hydrocarbon feedstock contains sulphur compounds, before, or preferably after, compression, it may be subjected to desulphurisation, e.g. hydrodesulphurisation using for example a conventional nickel/molybdenum and/or cobalt/molybdenum hydrodesulphurisation catalysts followed by adsorption of hydrogen sulphide using a suitable adsorbent, e.g. zinc oxide. The hydrocarbon feedstock is typically compressed to a pressure in the range 10-100 bar abs, particularly 20-60 bar abs.

Before, or preferably after, compression of the hydrocarbon feedstock, the hydrocarbon is mixed with steam. This steam introduction may be effected by direct injection of steam and/or by saturation of the feedstock by contact of the latter with a stream of heated water. The amount of steam included is preferably such as to give an overall steam to carbon ratio of 0.5 to 2, more preferably 1 to 2, i.e. preferably 0.5 to 2, more preferably 1 to 2 moles of steam per gram atom of hydrocarbon carbon in the feedstock.

The second stream preferably comprises 50-90% by volume or kmol/hour, more preferably 65-85% by volume or kmol/hour of the total hydrocarbon fed to the HER and ATR. Accordingly, the first stream preferably comprises 10-50% by volume or kmol/hour, preferably 15-35% by volume or kmol/hour of the total hydrocarbon fed to the HER and ATR. The steam contents of the first and second streams are preferably 40-60% by volume or kmol/hour of the total steam fed to the HER and ATR.

In addition to hydrocarbon and steam, the first and second streams may additionally comprise one or more of carbon monoxide, carbon dioxide, hydrogen and tail gas from downstream processes, e.g. refinery off-gases, Fischer-Tropsch tail gases or gases separated from methanol, olefin, dimethyl ether, ammonia or urea production.

In the present invention the second stream is pre-heated before it is fed to the autothermal reformer by heating it in heat exchange with the partially-cooled combined reformed gas mixture. The temperature of the gas fed to the autothermal reformer is preferably increased by between 50 and 200 degrees centigrade by this heating step, which provides improved thermal efficiency of the process. This is thereby achieved without increasing the feed temperature to the tube-side of the heat exchange reformer, which thereby does not increase the exit temperature from the shellside of the heat exchange reformer and so may be operated without increasing the size of the heat exchange reformer or the oxidant demand of the process. Any suitable gas-gas heat exchanger may be used. The pre-heating step may be performed before or after additional heating stages, but is preferably performed after a previous heating stage, which may be performed on the second stream alone or the mixed gas stream. This previous heating stage may be performed by a fired heater or by heat exchange with the product synthesis gas in an interchanger.

The first stream is reformed by passing it through externally-heated catalyst-filled tubed in a heat exchange reformer to form the first reformed gas mixture. In one type of heat exchange reformer, the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Heat exchange reformers of this type are described in GB 1 578 270 and WO 97/05 947. Another type of heat exchange reformer that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated. The first stream may be fed to the end of the outer tubes remote from said closed end so that the mixture passes through said annular space and undergoes steam reforming and then passes through the inner tube. In these embodiments it will be understood that the mixing of the second reformed gas mixture and the first reformed gas mixture to form the combined reformed gas mixture will preferably take place outside the heat exchange reformer. In another type of heat exchange reformer, the heat exchange reformer utilises catalyst-filled tubes extending from an upper tube sheet into a heat exchange zone where the first reformed gas mixture emerges from the catalyst filled tubes and is able to mix with the second reformed gas mixture. Heat exchange reformers of this type are described in the aforementioned U.S. Pat. No. 5,011,625. In this type of heat exchange reformer, it will be understood that the mixing of the second reformed gas mixture and the first reformed gas mixture to form the combined reformed gas mixture will take place within the heat exchange reformer. Using this type of heat exchange reformer for the present invention is preferred.

The second stream is reformed using an autothermal reformer. Autothermal or secondary reformers are known and generally comprise an elongate vessel with separate hydrocarbon fuel and oxidant feed lines connected to a burner disposed near the top of the vessel and a bed of steam reforming catalyst disposed beneath the burner. The hydrocarbon fuel (e.g. the hydrocarbon/steam mixture) and oxidant (e.g. oxygen-containing gas) are mixed and the hydrocarbon partially combusted in a flame by the burner. This raises the temperature of the partially combusted gas mixture, which is then subjected to steam reforming as it passes through the bed of steam reforming catalyst. The heat for the endothermic stream reforming reactions is thereby provided by the exothermic combustion (oxidation) reactions. Such an autothermal reformer is depicted in the aforesaid U.S. Pat. No. 5,011,625.

Before it is fed to the heat exchange reformer and/or autothermal reformer, the first stream and/or the second stream, or the mixed stream, may be subjected to a step of adiabatic low temperature steam reforming. In such a process, the hydrocarbon/steam mixture is heated, typically to a temperature in the range 400-650° C., and then passed adiabatically through a bed of a suitable catalyst, usually a catalyst having a high nickel content, for example above 40% by weight. During such an adiabatic low temperature reforming step any hydrocarbons higher than methane react with steam to give a mixture of methane, carbon oxides and hydrogen. The use of such an adiabatic reforming step, commonly termed pre-reforming, is desirable to ensure that the feed to the heat exchange reformer and autothermal reformer contains no hydrocarbons higher than methane and also contains a significant amount of hydrogen. This is desirable in order to minimise the risk of carbon formation.

After any such pre-reforming step, the first stream may be further heated, if necessary, to the heat exchange reformer inlet temperature, which is typically in the range 350-550° C. During passage through the catalyst-filled tubes, the endothermic steam reforming reaction takes place with the heat required for the reaction being supplied from the combined reformed gas flowing past the exterior surface of the tubes. The steam reforming catalyst in the HER may be nickel supported on a refractory support such as rings or pellets of calcium aluminate cement, alumina, titania, zirconia and the like. Alternatively, particularly when a steam ratio less than 1.0 is employed, a precious metal catalyst may be used as the primary reforming catalyst. Suitable precious metal catalysts include rhodium, ruthenium and platinum between 0.01 and 2% by weight on a suitable refractory support such as those used for nickel catalysts. Alternatively a combination of a nickel and precious metal catalyst may be used. For example, a portion of the nickel catalyst may be replaced with a precious metal catalyst, such as a ruthenium-based catalyst.

The temperature of the combined reformed gas is preferably sufficient that the gas undergoing reforming in the HER leaves the catalyst at a temperature in the range 900-1000° C.

The second stream fed to the autothermal reformer is subjected to autothermal reforming by mixing it with a gas containing free oxygen, effecting partial combustion of the mixture using a burner and passing the partially combusted gas through a bed of steam reforming catalyst.

Whereas some steam may be added to the oxygen-containing gas, preferably no steam is added to the oxygen-containing gas. The oxidant gas containing free oxygen is preferably substantially pure oxygen, e.g. oxygen containing less than 1% nitrogen. However where the presence of substantial amounts of inert gases is permissible, the oxidant gas containing free oxygen may be air or enriched air. Where the gas containing free oxygen is substantially pure oxygen, for metallurgical reasons it is preferably fed to the autothermal reformer at a temperature below about 250° C. The amount of oxygen required in the autothermal reformer is determined by two main considerations, viz. the desired composition of the product gas, and the heat balance of the heat exchange reformer. Decreasing the required amount of oxygen is advantageous as this means that a smaller, and hence cheaper, air separation plant can be employed to produce the oxygen. In the present process, the molar ratio of oxygen ($O_2$) to hydrocarbon fed to the ATR (expressed as methane, $CH_4$) is preferably in the range 0.6-0.8. The amount of oxygen-containing gas added is preferably such that 40 to 60 moles of oxygen are added per 100 gram atoms of hydrocarbon carbon in the hydrocarbon feedstock fed to the HER and ATR. Preferably the amount of oxygen added is such that the second reformed gas mixture leaves the autothermal reformer at a temperature in the range 950-1150° C.

The burner may be of any conventional design used in autothermal reformers.

The autothermal reforming catalyst may be nickel supported on a refractory support such as rings or pellets of calcium aluminate cement, alumina, titania, zirconia and the like. In a preferred embodiment, the autothermal reforming catalyst comprises an upper layer containing Ni or a precious metal such as Rh supported on a zirconia catalyst support, and a second lower layer comprising Ni on an alpha alumina or metal-aluminate support. Such layered catalysts may be more effective in maintaining low pressure drop through the bed than a single layer material.

A second reformed gas mixture is recovered from the autothermal reformer. The second reformed gas mixture may be mixed with the first reformed gas mixture and then the resulting combined reformed gas mixture passed to the heat exchange reformer, but preferably it is fed directly to the shell side of the heat exchange reformer where it is mixed with the first reformed gas mixture emerging from the catalyst filled tubes to form the combined reformed gas mixture in the shell side of the heat exchange reformer.

The combined reformed gas mixture is preferably at a temperature in the range 950-1150° C.

The combined reformed gas mixture heats the catalyst-filled tubes in the heat exchange reformer and as a result is cooled to form a partially-cooled combined reformed gas mixture. The temperature of the partially-cooled reformed gas mixture leaving the heat exchanger reformer is preferably in the range 500-700° C. The partially-cooled combined reformed gas mixture is recovered from the shell side of the heat exchange reformer and further cooled by using it to pre-heat the second stream fed to the autothermal reformer. The temperature of the second stream fed to the autothermal reformer is preferably in the range 450-650° C.

The partially cooled reformed gas mixture, once it has been used to pre-heat the second stream, may be further cooled by heat exchange with one or more streams including the hydrocarbon feedstock, steam, oxidant gas, or water under pressure, to form a wet synthesis gas stream. The wet synthesis gas stream may be cooled further with water to condense unreacted steam, which may be separated using conventional means to form a dry synthesis gas product, which may be used in downstream processes for the production of hydrogen, ammonia, methanol, dimethyl ether, olefins or Fischer-Tropsch hydrocarbons.

The cooling to effect condensation of the steam may be effected by contacting the reformed gas with a stream of cold water. As a result, a stream of heated water is formed which may be used to supply some or all of the steam required for reforming.

BRIEF DESCRIPTION OF THE DRAWING FIGURES

Figure 2:
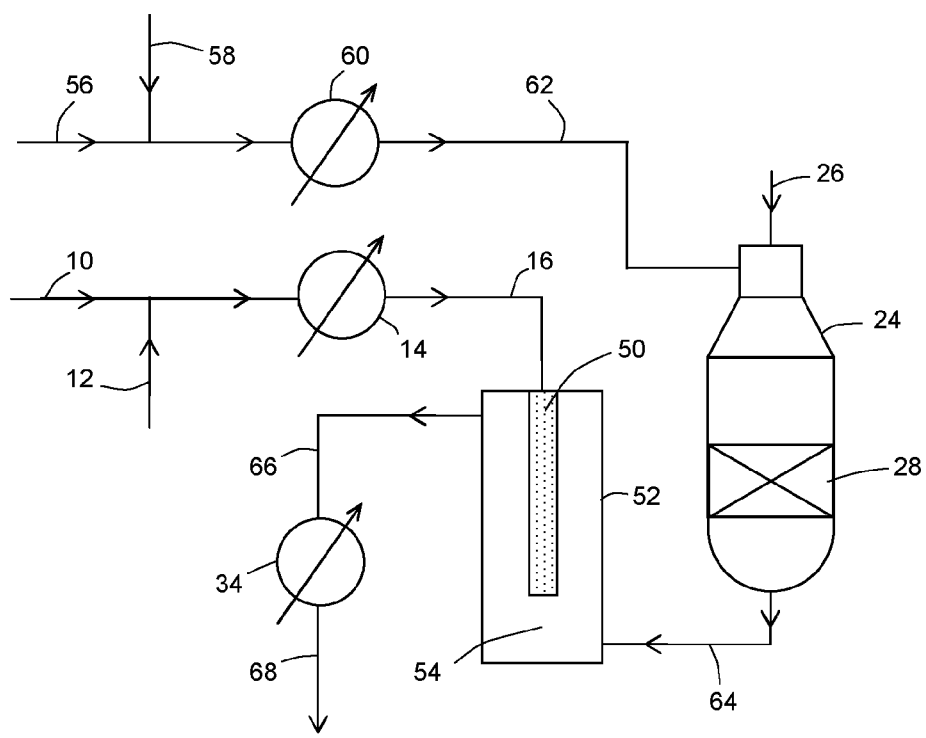
Figure 3:
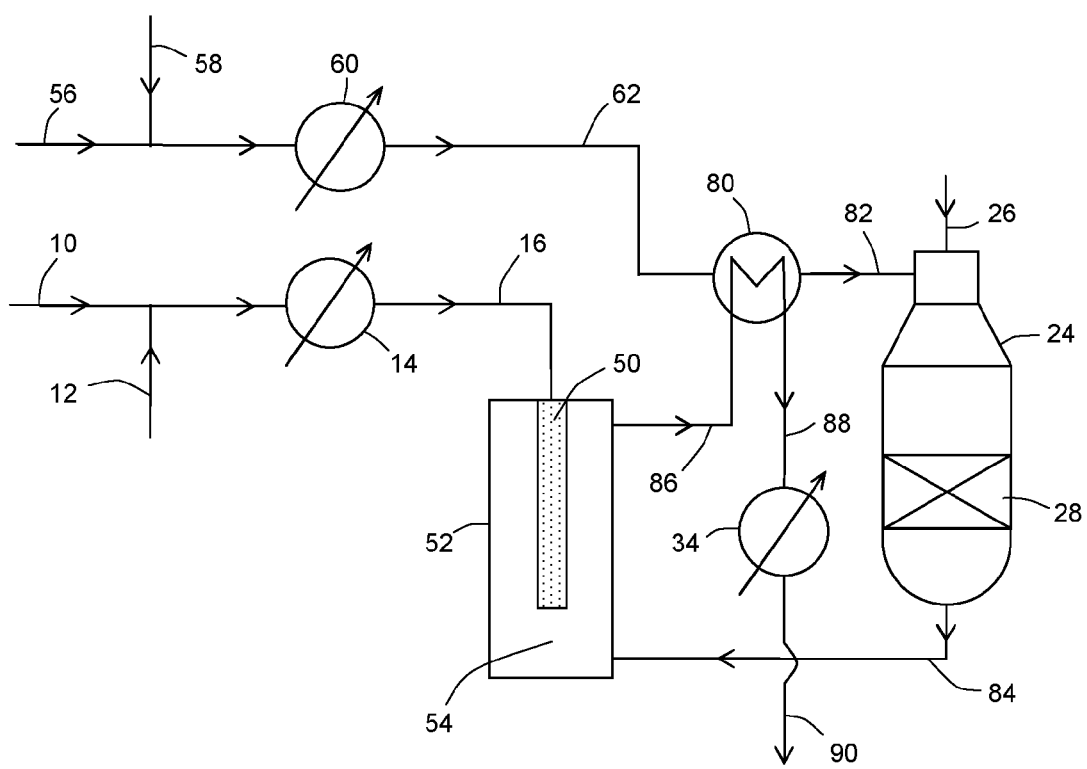

The invention is illustrated by reference to the accompanying drawings in which;

FIG. 1 is a comparative flowsheet wherein a mixed feed of hydrocarbon and steam is sent in series through a HER and ATR, FIG. 2 is a comparative flowsheet wherein first and second streams of hydrocarbon and steam are fed in parallel to the HER and ATR, and FIG. 3 is a flowsheet according to the present wherein first and second streams are fed in parallel to the HER and ATR with the second stream pre-heated by the partially-cooled reformed gas mixture.

DETAILED DESCRIPTION OF THE INVENTION

In FIG. 1, a hydrocarbon feedstock, for example natural gas containing over 90% v/v methane, fed via line 10 is mixed with steam fed via line 12 and passed to heat exchanger 14 where it is heated to a temperature in the range 300-500° C. The resulting mixture is fed, typically at a pressure in the range 20 to 60 bar abs., via line 16 to the catalyst-containing tubes 18 of a heat exchange reformer 20. For simplicity, only one tube is shown in the drawing: in practice there may be several tens or hundreds of such tubes. The hydrocarbon feedstock/steam mixture undergoes steam reforming in the tubes 18 and the reformed gas leaves the heat exchange reformer 20 via line 22, typically at a temperature in the range 650 to 850° C. The reformed gas in line 22 is fed to an autothermal reformer 24, to which oxygen is supplied via line 26. In the autothermal reformer, the feed stream 22 is partially combusted using burner apparatus (not shown) and the partially combusted gas brought towards equilibrium by passage over a bed of steam reforming catalyst 28. The reformed gas leaves autothermal reformer 24 via line 30, typically at a temperature in the range 900 to 1050° C. Heat is recovered from the hot reformed gas 30 by passing it to the shell side of the heat exchange reformer 20 so that the autothermally reformed gas acts as the heating medium of the heat exchange reformer. The autothermally reformed gas is thus cooled by heat exchange with the gas undergoing reforming in the tubes 18 and leaves the heat exchange reformer via line 32, typically at a temperature 50 to 200° C. above the temperature at which the hydrocarbon stream/steam mixture 16 is fed to the tubes 18. The partially cooled reformed gas 32 is then cooled further with heat recovery in one or more heat exchangers 34 to a temperature below the dew point of the steam and the condensate separated in one or more separators (not shown) to obtain a dry synthesis gas 36.

In FIG. 2, a hydrocarbon feedstock, for example natural gas containing over 90% v/v methane, fed via line 10 is mixed with steam fed via line 12 to form a first stream which is passed to heat exchanger 14 where it is heated to a temperature in the range 350-550° C. The heated first stream is fed, typically at a pressure in the range 20 to 60 bar abs., via line 16 to the catalyst-containing tubes 50 of a heat exchange reformer 52. The heated first stream undergoes steam reforming in the tubes 50 and a first reformed gas mixture is formed, typically at a temperature in the range 900 to 1000° C. For simplicity only one tube is shown in the drawing: in practice there may be several tens or hundreds of such tubes. The tubes 50 in heat exchange reformer 52 discharge the first reformed gas mixture into a mixing zone 54 within the heat exchange reformer. A further amount of the hydrocarbon feedstock, fed via line 56 is mixed with steam fed via line 58 to form a second stream which is passed to heat exchanger 60 where it is heated to a temperature in the range 350-550° C. The heated second stream is fed, typically at a pressure in the range 20 to 60 bar abs., via line 62 to an autothermal reformer 24, to which oxygen is supplied via line 26. The amount of hydrocarbon fed to the autothermal reformer is 50-90% by volume or kmol/hour of the total hydrocarbon fed to the heat exchange reformer and autothermal reformer. The amount of steam in the second stream is 40-60% by volume or kmol/hour of the total steam fed to the heat exchange reformer and autothermal reformer. The amount of oxygen fed to the autothermal reformer is such that 40 to 60 moles of oxygen are added per 100 gram atoms of total hydrocarbon feedstock fed to the heat exchange reformer and autothermal reformer. In the autothermal reformer, the feed stream 62 is partially combusted using burner apparatus (not shown) and the partially combusted gas brought towards equilibrium by passage over a bed of steam reforming catalyst 28. The resulting second reformed gas mixture leaves autothermal reformer 24 via line 64, typically at a temperature in the range 950 to 1150° C. The second reformed gas mixture is passed via line 64 to the mixing zone 54 of the heat exchange reformer 52, where it is mixed with the first reformed gas mixture to form a combined reformed gas mixture at a temperature in the range 950-1150° C. Heat is recovered from the combined reformed gas mixture by passing it around the tubes 50 of the heat exchange reformer 52. The combined reformed gas mixture is thus cooled by heat exchange with the gas undergoing reforming in the tubes 50 and leaves the heat exchange reformer 50 via line 66, typically at a temperature in the range 500-700° C. The partially cooled combined reformed gas 66 is then cooled further with heat recovery in one or more heat exchangers 34 to a temperature below the dew point of the steam and the condensate separated in one or more separators (not shown) to obtain a dry synthesis gas 68.

In FIG. 3, a hydrocarbon feedstock, for example natural gas containing over 90% v/v methane, fed via line 10 is mixed with steam fed via line 12 to form a first stream which is passed to heat exchanger 14 where it is heated to a temperature in the range 350-550° C. The heated first stream is fed, typically at a pressure in the range 20 to 60 bar abs., via line 16 to the catalyst-containing tubes 50 of a heat exchange reformer 52. The heated first stream undergoes steam reforming in the tubes 50 and a first reformed gas mixture is formed, typically at a temperature in the range 900 to 1000° C. For simplicity only one tube is shown in the drawing: in practice there may be several tens or hundreds of such tubes. The tubes 50 in heat exchange reformer 52 discharge the first reformed gas mixture into a mixing zone 54 within the heat exchange reformer.

A further amount of the hydrocarbon feedstock, fed via line 56 is mixed with steam fed via line 58 to form a second stream which is passed to heat exchanger 60 where it is heated to a temperature in the range 350-550° C. The heated second stream 62 is fed to a further heat exchanger 80 where it is heated to a temperature in the range 450-650° C., and thence fed at a pressure in the range 20 to 60 bar abs., via line 82 to an autothermal reformer 24, to which oxygen is supplied via line 26. The amount of hydrocarbon fed to the autothermal reformer is 50-90% by volume or kmol/hour of the total hydrocarbon fed to the heat exchange reformer and autothermal reformer. The amount of steam in the second stream is 40-60% by volume or kmol/hour of the total steam fed to the heat exchange reformer and autothermal reformer. The amount of oxygen fed to the autothermal reformer is such that 40 to 60 moles of oxygen are added per 100 gram atoms of total hydrocarbon feedstock fed to the heat exchange reformer and autothermal reformer.

In the autothermal reformer, the feed stream 82 is partially combusted using burner apparatus (not shown) and the partially combusted gas brought towards equilibrium by passage over a bed of steam reforming catalyst 28. The resulting second reformed gas mixture leaves autothermal reformer 24 via line 84, typically at a temperature in the range 950 to 1150° C.

The second reformed gas mixture is passed via line 84 to the mixing zone 54 of the heat exchange reformer 52, where it is mixed with the first reformed gas mixture to form a combined reformed gas mixture at a temperature in the range 950-1150° C. Heat is recovered from the combined reformed gas mixture by passing it around the tubes 50 of the heat exchange reformer 52. The combined reformed gas mixture is thus cooled by heat exchange with the gas undergoing reforming in the tubes 50 and leaves the heat exchange reformer 50 via line 86, typically at a temperature in the range 500-700° C.

The partially-cooled combined reformed gas 86 is fed to heat exchanger 80 where it is further cooled as it pre-heats the second stream 62. The temperature of the feed stream 62 is increased by 50 to 200 degrees centigrade and the partially-cooled combined reformed gas is further cooled. The cooled combined reformed gas mixture is recovered from heat exchanger 80 via line 88 and then cooled further with heat recovery in one or more heat exchangers 34 to a temperature below the dew point of the steam and the condensate separated in one or more separators (not shown) to obtain a dry synthesis gas 90.

In alternative embodiment, the first stream 16 and second stream 62 are formed from a combined hydrocarbon/steam stream that is passed through a single fired heater before being divided, or preferably from a combined hydrocarbon/steam stream that is passed through an interchanger in heat exchange with the product reformed gas 88.

The invention is further illustrated by reference to the following calculated examples.

Example 1

Flow sheets according to FIGS. 1, 2 and 3 have been modelled to illustrate a series scheme, a comparative parallel scheme and an improved parallel scheme. All the schemes are modelled based on the same natural gas and steam feed flowrate and temperature so that the effects of the reforming scheme efficiencies can be compared on a like for like basis. Tables 1 to 3 contain the flowrates, temperatures and pressures for the three flowsheets.

A base case design flowsheet as illustrated in FIG. 1 is set out in Table 1.

TABLE 1

| | Comparative series scheme | | | | | | |
|---|---|---|---|---|---|---|---|
| Stream | 10 | 12 | 16 | 22 | 26 | 30 | 32 |
| T (° C.) | | | 450 | 692 | 50 | 1000 | 546 |
| P (barg) | | | 44.5 | 39.9 | 43.5 | 38.9 | 38.4 |
| Flowrate (kmol/h) | 7832 | 16891 | 24723 | | 3811 | | 41139 |

TABLE 1-continued

| | Comparative series scheme | | | | | | |
|---|---|---|---|---|---|---|---|
| Stream | 10 | 12 | 16 | 22 | 26 | 30 | 32 |
| Steam:Carbon ratio | | | 2.0 | | | | |
| Methane slip (% wet gas) | | | | | | | 0.64 |

The mixed feed temperature is 450° C. and the shellside exit temperature is 546° C. The natural gas feed flow is 7832 kmol/hr with a steam flow of 16891 kmol/hr giving a total feed flow of 24723 kmol/hr at a steam ratio of 2.0. This reacts with an oxygen flow of 3811 kmol/hr, which gives an ATR exit temperature, of 1000° C. and a methane slip of 0.64 mol % wet. The reformed gas flow of 41139 kmol/hr will produce 6000 mtpd of methanol.

The comparative parallel scheme as shown in FIG. 2 is set out in Table 2.

TABLE 2

| | Comparative parallel scheme | | | | | | | | |
|---|---|---|---|---|---|---|---|---|---|
| Stream | 10 | 12 | 16 | 56 | 58 | 62 | 26 | 64 | 66 |
| T (° C.) | | | 450 | | | 450 | 50 | 1050 | 598 |
| P (barg) | | | 40.5 | | | 39.9 | 43.5 | 38.9 | 38.4 |
| Flowrate (kmol/h) | 1929 | 8310 | 10239 | 5903 | 8581 | 14484 | 3975 | | 41166 |
| Steam:Carbon ratio | | | 4.0 | | | 1.35 | | | |
| Methane slip (% wet gas) | | | | | | | | | 0.61 |

Although the feed streams are shown as separate, in this calculation they have been preheated to a common preheat temperature of 450° C. as per the series scheme. In this case, due to the thermal design of the HER, the reformed gas at the shellside exit cannot be cooled to the same 546° C. of the series scheme. This is because the temperatures of the shellside gas and the tubeside gas would cross. Therefore, to achieve a realistic design of HER for this duty, an exit temperature of 598° C. was chosen. This creates enough of a temperature difference to generate an economic HER design. The natural gas split has been set at 25% for the parallel scheme and the steam split arranged so that the methane slip from both streams is similar. However, to reach a similar methane slip as the series scheme on FIG. 1 requires the oxygen flow to be increased to 3975 kmol/hr to compensate for the increased heat loss from the shellside exit. The 4.3% increase in oxygen flow reduces the hydrogen content of the reformed gas and even though the total reformed gas flow is slightly higher, this case could only produce 5932 mtpd of methanol, or 1.1% less than the series scheme. Therefore, to produce the same methanol, all of the flows quoted below would need to be increased by 1.1%. The parallel scheme therefore has both a thermal efficiency loss, a requirement for more oxygen but also a production efficiency loss.

The improved parallel reforming scheme as illustrated in FIG. 3 is set out in Table 3.

TABLE 3

| | Improved parallel scheme | | | | | | | | | | |
|---|---|---|---|---|---|---|---|---|---|---|---|
| Stream | 10 | 12 | 16 | 56 | 58 | 62 | 82 | 26 | 84 | 86 | 88 |
| T (° C.) | | | 450 | | | 450 | 550 | 50 | 1050 | 597 | 546 |
| P (barg) | | | 40.5 | | | 39.5 | | 43.5 | 38.9 | | 38.4 |
| Flowrate (kmol/h) | 1929 | 8310 | 10239 | 5903 | 8581 | 14484 | | 3811 | | | 41143 |

TABLE 3-continued

Improved parallel scheme

| Stream | 10 | 12 | 16 | 56 | 58 | 62 | 82 | 26 | 84 | 86 | 88 |
|---|---|---|---|---|---|---|---|---|---|---|---|
| Steam:Carbon ratio | | | 4.0 | | | 1.35 | | | | | |
| Methane slip (% wet gas) | | | | | | | | | | | 0.64 |

This shows that the combined natural gas and steam feeds are the same as for the series and parallel schemes and at the same 450° C. temperature. The HER shellside exit temperature is the same as the comparative parallel scheme at 597° C. to achieve a reasonably sized HER. The reformed gas is then further cooled to the same 546° C. as in the series scheme by heating the ATR feed up to 550° C. from 450° C. The splits of steam and natural gas to the HER and ATR are the same as in the comparative parallel scheme. With the additional heat recovery in the improved parallel scheme the oxygen flow is reduced to the same flow as for the series scheme at 3811 kmol/hr and the reformed gas flow and methane slip are also the same. The reformed gas in the improved series scheme can produce 6000 mtpd of methanol, the same as the series scheme and 1.1% higher than the normal parallel scheme at the same feed flows.

Thus the process of the present invention offers improved efficiency over the conventional parallel scheme, and is able to provide as efficient a process as the series scheme but with a simpler GHR design and with a lower pressure drop and so a smaller feed gas compressor may be used.

The invention claimed is:

1. A process for the conversion of a hydrocarbon feedstock into a synthesis gas, comprising:
   (i) forming a mixed feed stream comprising a hydrocarbon feedstock and steam;
   (ii) preheating the mixed stream to form a pre-heated mixed stream;
   (iii) dividing the preheated mixed stream into a first stream and a second stream;
   (iv) passing the first stream comprising a hydrocarbon and steam to externally-heated catalyst-filled tubes in a heat exchange reformer where steam reforming reactions take place to generate a first reformed gas mixture;
   (v) passing the second stream comprising a hydrocarbon and steam, after a heating step, to an autothermal reformer, where it is combined with an oxidant gas containing free oxygen and autothermally reformed to generate a second reformed gas mixture;
   (vi) mixing the second reformed gas mixture and the first reformed gas mixture to form a combined reformed gas mixture; and
   (vii) using the combined reformed gas mixture to heat the catalyst filled tubes in the heat exchange reformer to form a partially-cooled combined reformed gas mixture, wherein the partially-cooled combined reformed gas mixture is used to pre-heat the second stream fed to the autothermal reformer by heat exchange, so that the temperature of the gas fed to the autothermal reformer is increased by between 50 and 200 degrees centigrade.

2. The process according to claim 1, wherein the partially-cooled combined reformed gas mixture is used to pre-heat the second stream fed to the autothermal reformer and preheat the mixed stream.

3. The process according to claim 1, wherein the second stream comprises 50-90% by volume of the total hydrocarbon fed to the heat exchange reformer and autothermal reformer.

4. The process according to claim 1, wherein the steam contents of the first and second streams are 40-60% by volume of the total steam fed to the heat exchange reformer and autothermal reformer.

5. The process according to claim 1, wherein the amount of steam included is such as to give an overall steam to carbon ratio of 0.5 to 2.

6. The process according to claim 1, wherein the first and second streams additionally comprise one or more of carbon monoxide, carbon dioxide, hydrogen and a tail gas from a downstream process.

7. The process according to claim 1, wherein the heat exchange reformer inlet temperature is in the range 350-550° C.

8. The process according to claim 1, wherein 40 to 60 moles of oxygen are added per 100 gram atoms of hydrocarbon carbon in the hydrocarbon feedstock fed to the heat exchange reformer and autothermal reformer.

9. The process according to claim 1, wherein the combined reformed gas mixture is at a temperature in the range 950-1150° C.

10. The process according to claim 1, wherein the temperature of the second stream fed to the autothermal reformer is in the range 450-650° C.

11. The process according to claim 1, wherein the partially cooled reformed gas mixture, once it has been used to pre-heat the second stream, is further cooled to form a wet synthesis gas stream by heat exchange with one or more streams selected from the hydrocarbon feedstock, steam, oxidant gas, or water under pressure.

12. The process according to claim 11, wherein the wet synthesis gas stream is cooled further with water to condense unreacted steam, which is separated, to form a dry synthesis gas product.

13. The process according to claim 1, wherein the second stream comprises 65-85% by volume of the total hydrocarbon fed to the heat exchange reformer and autothermal reformer.

14. The process according to claim 1, wherein the amount of steam included is such as to give an overall steam to carbon ratio of 1 to 2.

* * * * *